(12) United States Patent
Sivaratri et al.

(10) Patent No.: US 10,798,189 B1
(45) Date of Patent: Oct. 6, 2020

(54) SYSTEMS AND METHODS FOR PROVIDING OR REQUESTING AVIONICS SIMULATION DATA USING API ADAPTER

(71) Applicant: Honeywell International Inc., Morris Plains, NJ (US)

(72) Inventors: Mahesh Sivaratri, Bangalore (IN); Raghu Shamasundar, Bangalore (IN); Rajeev Mohan, Bangalore (IN); Sushma Bidrupane, Bangalore (IN); Soumitri Swain, Bangalore (IN); Mythili Belle, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/385,253

(22) Filed: Apr. 16, 2019

(51) Int. Cl.
*G09B 9/02* (2006.01)
*H04L 29/08* (2006.01)
*G09B 9/08* (2006.01)
*H04L 29/06* (2006.01)

(52) U.S. Cl.
CPC ............. *H04L 67/16* (2013.01); *G09B 9/08* (2013.01); *H04L 67/02* (2013.01); *H04L 67/38* (2013.01)

(58) Field of Classification Search
CPC ......... H04L 67/02; H04L 67/12; H04L 67/38; H04L 63/10; H04L 69/14; G09B 9/08; G09B 9/24; G09B 19/165
USPC ........................................................ 709/246
See application file for complete search history.

(56) References Cited

U.S. PATENT DOCUMENTS

| 7,188,059 | B2 | 3/2007 | White et al. |
| 7,395,344 | B2 | 7/2008 | Sandell et al. |
| 8,812,284 | B2 | 8/2014 | Damiani et al. |
| 8,868,259 | B2 * | 10/2014 | Srinivasan ........... G08G 5/0043 701/3 |

(Continued)

FOREIGN PATENT DOCUMENTS

| EP | 3229220 A1 | 10/2017 |
| WO | 2013033117 A1 | 3/2013 |

OTHER PUBLICATIONS

Thomson, D., "Application of Service-Oriented Architecture to Distributed Simulation," AIAA Modeling and Simulation Technologies Conference and Exhibit, Aug. 18, 2008 (22 pages).

(Continued)

*Primary Examiner* — Ruolei Zong
(74) *Attorney, Agent, or Firm* — Bookoff McAndrews, PLLC (57) ABSTRACT

Systems and methods are disclosed for providing or requesting data for simulating avionics systems. For example, a method for providing data for simulating avionics systems may include: receiving, from a client device, a first message requesting information usable by the client device to simulate a functionality of an avionics system, the first message being in a web services data format; converting the first message to an avionics protocol data format to obtain a first converted message; providing the first converted message to a server application; receiving, from the server application, a second message including the requested information, the second message being in the avionics protocol data format; converting the second message to the web services data format to obtain a second converted message; and providing, to the client device, the second converted message.

20 Claims, 7 Drawing Sheets

(56) References Cited

U.S. PATENT DOCUMENTS

| | | | | |
|---|---|---|---|---|
| 9,230,446 | B1* | 1/2016 | Mendro | G09B 9/003 |
| 9,482,552 | B2 | 11/2016 | Dabrowski | |
| 9,690,577 | B1 | 6/2017 | Crew et al. | |
| 2012/0221305 | A1 | 8/2012 | Srivastav et al. | |
| 2012/0232791 | A1* | 9/2012 | Sterkel | H04H 20/62 |
| | | | | 701/454 |
| 2016/0055275 | A1 | 2/2016 | Wang et al. | |
| 2016/0202874 | A1 | 7/2016 | Lizer et al. | |
| 2017/0106286 | A1* | 4/2017 | Yudintsev | A63F 13/537 |
| 2017/0236439 | A1* | 8/2017 | Bowness | G09B 9/08 |
| | | | | 434/362 |
| 2018/0336493 | A1* | 11/2018 | Hayes | G06F 9/54 |

OTHER PUBLICATIONS

"Boeing: Simulator Management," Web page <https://www.boeing.com/commercial/services/training-and-resourcing/simulator-management.page>, Apr. 30, 2018, retrieved from Web Archive <http://web.archive.org/web/28180430220635/https://www.boeing.com/commercial/services/training-and-resourcing/simulator-management.page> on Aug. 6, 2020 (11 pages).

Savard, J., "Intégration D'un Simulateur De Partitionnement Spatial et Temporel à Un Flot De Conception Basé Sur Les Modèles," Département De Génie Informatique Et Génie Logiciel École Polytechnique De Montréal: Mémoire Présenté En Vue De L'Obtention Du Diplôme De Maîtrise En Sciences Appliquées, Dec. 2012, with English abstract (145 pages).

Zheng, S. et al., "DDS Based High Fidelity Flight Simulator," 2009 WASE International Conference on Information Engineering, Jul. 10, 2009, pp. 548-551.

Farcas, C. et al., "Addressing the Integration Challenge for Avionics and Automotive Systems—From Components to Rich Services," Proceedings of the IEEE, vol. 98, Apr. 2010, pp. 562-583.

Johansson, B. et al., "Distributed Aircraft Analysis Using Web Service Technology," SAE World Aviation Congress, 2003 Aerospace Congress and Exhibition, Sep. 8, 2003 (11 pages).

Extended European Search Report in European Patent Application No. 20169217.5, dated Aug. 14, 2020 (11 pages).

* cited by examiner

SYSTEMS AND METHODS FOR PROVIDING OR REQUESTING AVIONICS SIMULATION DATA USING API ADAPTER

TECHNICAL FIELD

Various embodiments of the present disclosure relate generally to systems and methods for providing or requesting avionics simulation data using application programming interface (API) adapters and, more particularly, to such systems and methods wherein the simulation data is used for pilot training or familiarization.

BACKGROUND

In order to conduct flight missions safely and efficiency, pilots require adequate training and familiarization in avionics. Insufficient training in the use and limitations of avionics may result in aviation accidents. Additionally, avionics technologies evolve over time to provide new features that improve safety and efficiency. Pilots who are inadequately trained on recent avionics technologies may be unable to reap the benefits of such technological advancements.

Therefore, there is a need for systems and methods that facilitate delivery of cost-effective training and familiarization services that are accessible from personal computing devices. There is also a need for such systems and methods to be compatible with training services that offer accurate simulation of avionics systems on such personal computing devices.

The present disclosure is, in certain aspects, directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for providing or requesting data through the use of API adapters, wherein such data may be used for avionics simulations.

For instance, a method for providing data for simulating avionics systems may include: receiving, from a client device, a first message requesting information usable by the client device to simulate a functionality of an avionics system, the first message being in a web services data format; converting the first message to an avionics protocol data format to obtain a first converted message; providing the first converted message to a server application; receiving, from the server application, a second message including the requested information, the second message being in the avionics protocol data format; converting the second message to the web services data format to obtain a second converted message; and providing, to the client device, the second converted message.

Furthermore, a computer system for providing data for simulating avionics systems may include a memory storing instructions; and one or more processors configured to execute the instructions to perform operations. The operations may include: receiving, from a client device, a first message requesting information usable by the client device to simulate a functionality of an avionics system, the first message being in a web services data format; converting the first message to an avionics protocol data format to obtain a first converted message; providing the first converted message to a server application; receiving, from the server application, a second message including the requested information, the second message being in the avionics protocol data format; converting the second message to the web services data format to obtain a second converted message; and providing, to the client device, the second converted message.

Furthermore, a non-transitory computer-readable medium storing instructions that, when executed by one or more processors, cause the one or more processors to perform a method for requesting data for simulating avionics systems. The method may include: receiving, from an avionics simulation application, a first message requesting information usable by the avionics simulation application to simulate a functionality of an avionics system, the first message being in an avionics protocol data format; converting the first message to a web services data format to obtain a first converted message; providing the first converted message to a server; receiving, from the server, a second message including the requested information, the second message being in the web services data format; converting the second message to the avionics protocol data format to obtain a second converted message; and providing, to the avionics simulation application, the second converted message.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "training" generally encompasses familiarization.

In the following description, embodiments will be described with reference to the accompanying drawings. Various embodiments pertain to enabling communication between a client device (such as a tablet computer) and a server application through the use of application programming interface (API) adapters. The server application may be a cloud-based avionics service having an API that communicates in an avionics protocol, such as an ARINC protocol. Such a service may provide flight management system (FMS) services to avionics used in aircraft.

In order to permit use of the API by the client device for simulations used for pilot training and familiarization, a server-side API adapter may be implemented at the server system and a client-side API adapter may be implemented at the client device. The API adapters may perform protocol translation of messages between the API and the client device. For example, the server-side API adapter may convert a message, received from the API of the cloud-based avionics service, from an avionics protocol data format to a web services data format (e.g., HTTP message format), and the client server system may convert the message back to the avionics data format. Accordingly, the cloud-based service may communicate with the client device so as to provide data for simulations used for pilot training and familiarization, even when the cloud-based service has an API that operates under an avionics protocol.

Figure 1:
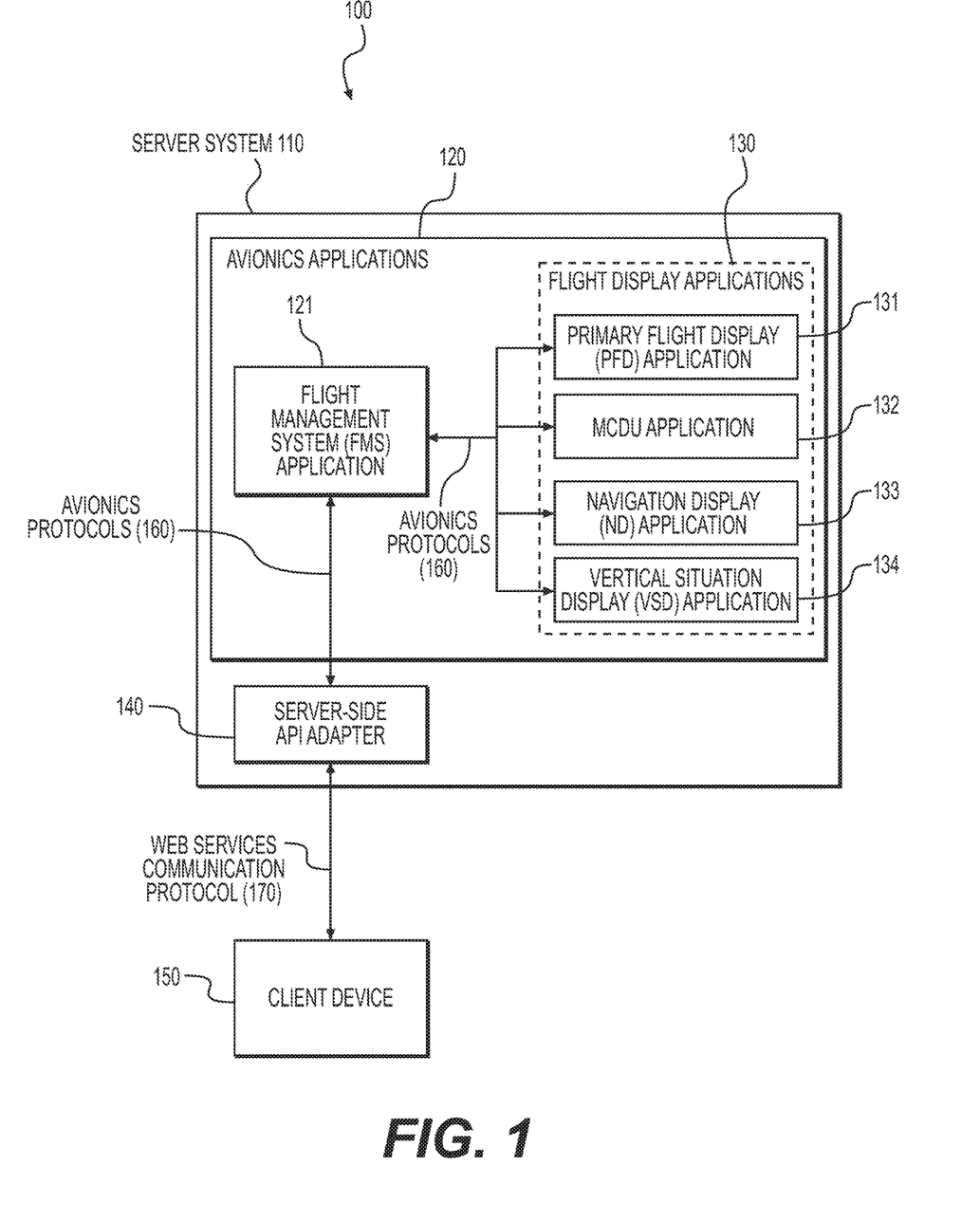
FIG. 1 illustrates an avionics network environment according to one or more embodiments.

FIG. 1 illustrates a system 100 that implements an avionics network environment, according to one or more embodiments of the present disclosure. The system 100 may include a server system 110 and a client device 150.

Server system 110 may execute avionics applications 120, any one of which may provide a service used by the client device 150. For example, as will be discussed in more detail below, the avionics applications 120 may control various applications executed on client device 150 that simulate avionics systems used onboard aircraft, such as flight displays. Such client device applications that simulate avionics systems may be used for training and familiarizing aircraft operators, such as pilots, in operating avionics. Server system 110 may also execute a server-side application programming interface (API) adapter 140 that converts data of any one or more of the avionics applications for use by client device 150.

Server system 110 may be a computer system that includes a memory storing instructions and one or more processors configured to execute the instructions to perform various operations described in the present disclosure. In some embodiments, server system 110 may have a cloud computing platform with scalable resources for computation and/or data storage, and may run software components, such as the avionics applications 120 and the server-side API adapter 140, on the cloud computing platform. However, the present disclosure is not limited to cloud computing implementations for server system 110. In general server system 110 may take the form of any computer system configured to operate as a server, including personal computers and mobile computing devices, for example. A computer system may be a computing device or a plurality of computing devices.

Client device 150 may be a computer system comprising one or more computing devices. In some embodiments, client device 150 may be a personal computer such as a laptop or desktop computer, or a mobile computing device such as a tablet computer or smartphone. A mobile computer device may also be referred to as a hand-held computing device. The user of the client device 150 may be an aircraft operator, such as a pilot.

Avionics applications 120 may include flight display applications 130. Flight display applications 130 may include applications for cockpit displays, such as a primary flight display (PFD) application 131, a multi-function control and display unit (MCDU) application 132, a navigation display (ND) application 133, and a vertical situation display (VSD) application 134. Examples of other components include navigation systems, such as Honeywell International Inc.'s Integrative Navigation (INAV) system, and multi-function displays (MFD).

Avionics applications 120 may include a flight management system (FMS) application 121. The FMS application 121 may enable the server system 110 to operate as a remote FMS providing various functionalities of an on-board FMS. In the implementation shown in FIG. 1, FMS application 121 may serve as an intermediary between the flight display applications 130 and the server-side API adapter 140. For example, FMS application 121 may process data generated by flight display applications 130 to be sent to the client device 140. 130 and the client device 150. However, it is, in general, possible any of the avionics applications 120 to communicate with (e.g., receive data from and/or transmit data to) client device 150 through the server-side API adapter 140, without the intervention of another one of the avionics applications 120. For example, it is possible for any of the flight display applications 130, or another avionics application not shown in FIG. 1 to send data directly to the server-side API adapter 140.

Any one or more of the avionics applications may be a certified avionics application that sends and provides data in a manner compliant with avionics standards and protocols. In some embodiments, in addition to providing a service used by client device 150, any one or more of the avionics applications 120 may also have the capability of providing services used by aircraft. For example, FMS application 121 may also be configured to provide various flight management services to such aircraft during a flight. When avionics applications 120 are hosted on server system 110, server system 110 may communicate with aircraft through satellite communication, air-to-ground communications, and/or other connected aircraft technologies.

Server system 110 may be remotely connected to the client device 150 through a communication network.

Figure 2:
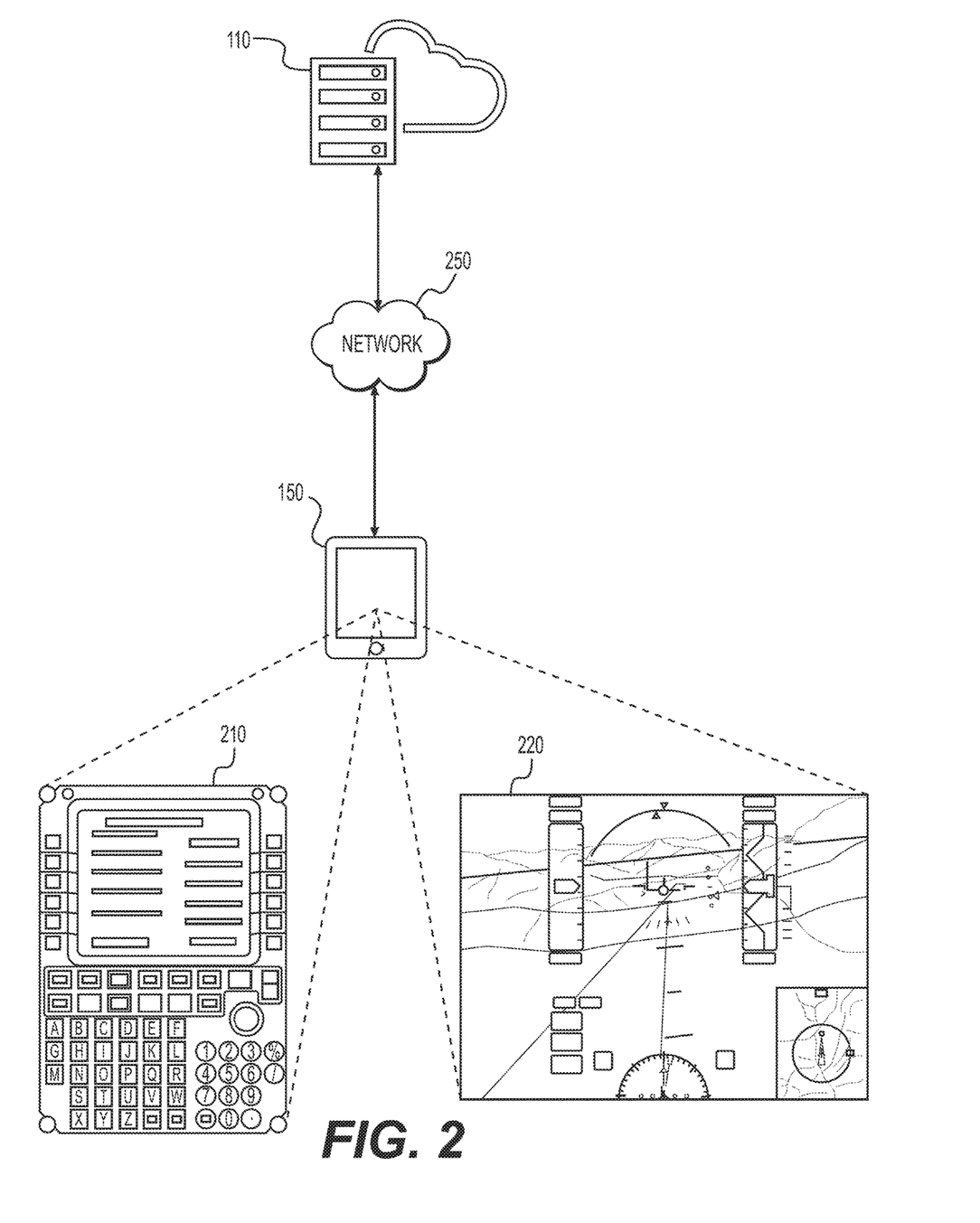
FIG. 2 illustrates an implementation of the system of FIG. 1, according to one or more embodiments.

FIG. 2 illustrates an example implementation of the system 100 of FIG. 1. In FIG. 2, the server system 110 is illustrated as a cloud server system, and the client device 150 is illustrated as a tablet computer. As shown in FIG. 2, the server system and the client device 150 may be connected to one another through an electronic network 250 that enables communication between the various components connected thereto. In some embodiments, electronic network 250 may include any combinations of public networks, such as the internet, and private networks.

As shown in FIG. 1, avionics applications 120 may receive or transmit data in a manner compliant with industry-standard avionics protocols 160. Examples of avionics systems protocols 160 include ARINC protocols and Honeywell proprietary Electronic Display System interface contract document (ICD) (EDS ICD). For example, ARINC 739 is a protocol that may be used in communications between avionics components (e.g., FMS) and MCDUs, and ARINC 661 and ARINC 702 are protocols are used in communications between avionics components and multi-function displays, NDs, VSDs, and PFDs. For example, in the configuration shown in FIG. 1, FMS application 121 may communicate with the flight display applications 130 using such avionics protocols 160. In doing so, the FMS application 121 may be configured to receive and generate data in a format that complies with such protocols. A data format for messages that comply with an avionics protocol may also be referred to as an avionics protocol data format.

As illustrated in FIG. 2, the client device 150 may simulate the functionalities of avionics systems 130 on a display screen of the client device 150. Such simulations may be performed by client device applications (e.g., client device applications 152 of FIG. 3). Such functionalities may include, for example, display functionalities, data processing functionalities, and user-input functionalities. For example, the client device 150 may have an MCDU application (e.g., MCDU application 401 described below in relation to FIG. 4) configured to generate a screen 210 to simulate the display screen and control panel of an MCDU. The client device 150 may also have a PFD application (e.g., PFD application 404 described below in relation to FIG. 4) configured to generate a screen 220 simulating the display screen of a PFD. While not illustrated in FIG. 2, screen 220 may also include a control panel used on PFDs. Screens 210 and 220 may be displayed in a browser, an app, a software application, etc. Simulations of avionics systems on client device 150 may utilize data provided by a sensors simulators (simulating aircraft position, altitude, speed, for example) running on client device 150 (e.g., sensor simulator 405 described below in relation to FIG. 4) and/or server system 110.

Client device 150 may generate screens 210 and 220 to simulate the functionalities of an MCDU and a PFD, respectively, and permit a user to interact with the screens in the manner of interacting with MCDU and PFD. Such screens 210 and 220 may be interactive. For example, a user may interact with the MCDU keyboard through a touchscreen or other input device (e.g., mouse or keyboard) of the client device 150, to perform actions simulating interactions with the control panel of an on-board MCDU. Such actions may be recorded as user inputs transmitted to the server system 110.

In general, client device applications may replicate the functionalities of any of the avionics systems 130 on user device 150. Information that is displayed by client device applications (e.g., the content of screens 210 and 220) may be generated, in whole or in part, by any one or more of the avionics applications 120, and may be received from the server system 110 for display on the client device 150. For example, the FMS application 121 described above may generate a flight plan for display on the client device 150. In some examples, the client device 150 may interpret data provided by the server system 110 and construct graphical images based on the interpreted data. However, it is also possible for graphical images to be partly or wholly constructed by the server system 110 and sent to the client device 150 for display. Information may be supplied from the server system 110 to the client device 150 in real time, allowing for real-time user interaction with the simulation.

As shown in FIG. 1, the client device 150 and the server system 110 may communicate using a web services communication protocol 170. In order to implement communication in the web services communication protocol 170, the server system 110 may execute a server-side API adapter 140 configured to perform protocol translation between avionics protocols 160 and web services communication protocol 170. In performing protocol translation, the server-side API adapter 140 may convert data between different formats.

Examples of web services communication protocol 170 include application-layer protocols used in web communication, such as HyperText Transfer Protocol (HTTP). As used in this disclosure, the term "HTTP" encompasses related extensions such as HyperText Transfer Protocol Secure (HTTPS). A web services data format may be a data format for messages that comply with a web services communication protocol, such as an HTTP message format in the case of HTTP. A message in HTTP message format, which may also be referred to as an HTTP message, may include components such as a start line, headers, and a body. A message in a web services data format may include content encoded in a data exchange format, such as XML or JavaScript Object Notation (JSON). Such content may be the payload of the message, or part of the payload.

Any one or more of the avionics applications 120 may each have an API that inputs and outputs data in an avionics protocol data format, while the client device 150 may be configured to input and output expect data in a web services data format, which is a data format that complies with the web services communication protocol. Therefore, by performing protocol translation between the avionics protocols 160 and the web services communication protocol 170, the server-side API adapter 140 may adapt the APIs of the avionics applications 120 so as to permit the APIs to be used by the client device 150. In this context, the APIs of the avionics applications 120 may refer to the APIs of any one or more of the avionics application 120, such as FMS application 121 shown in FIG. 1. In some implementations, the server-side API adapter 140 may be part of an API gateway or a reverse proxy configured to intercept communication from and to the client device 150, and provide proxy endpoints for any one or more of the avionics applications 120.

Server-side API adapter 140 may provide a Representational State Transfer (REST) API configured to receive API requests from client device 150 and send API responses to client device 150. In some implementations, the REST API may accept and generate messages encoded in JSON, in which case messages sent between the client device 150 and the server-side API adapter 140 may be referred to as JSON/REST messages. A request from client device 150 may be referred to as a REST API request.

Figure 3:
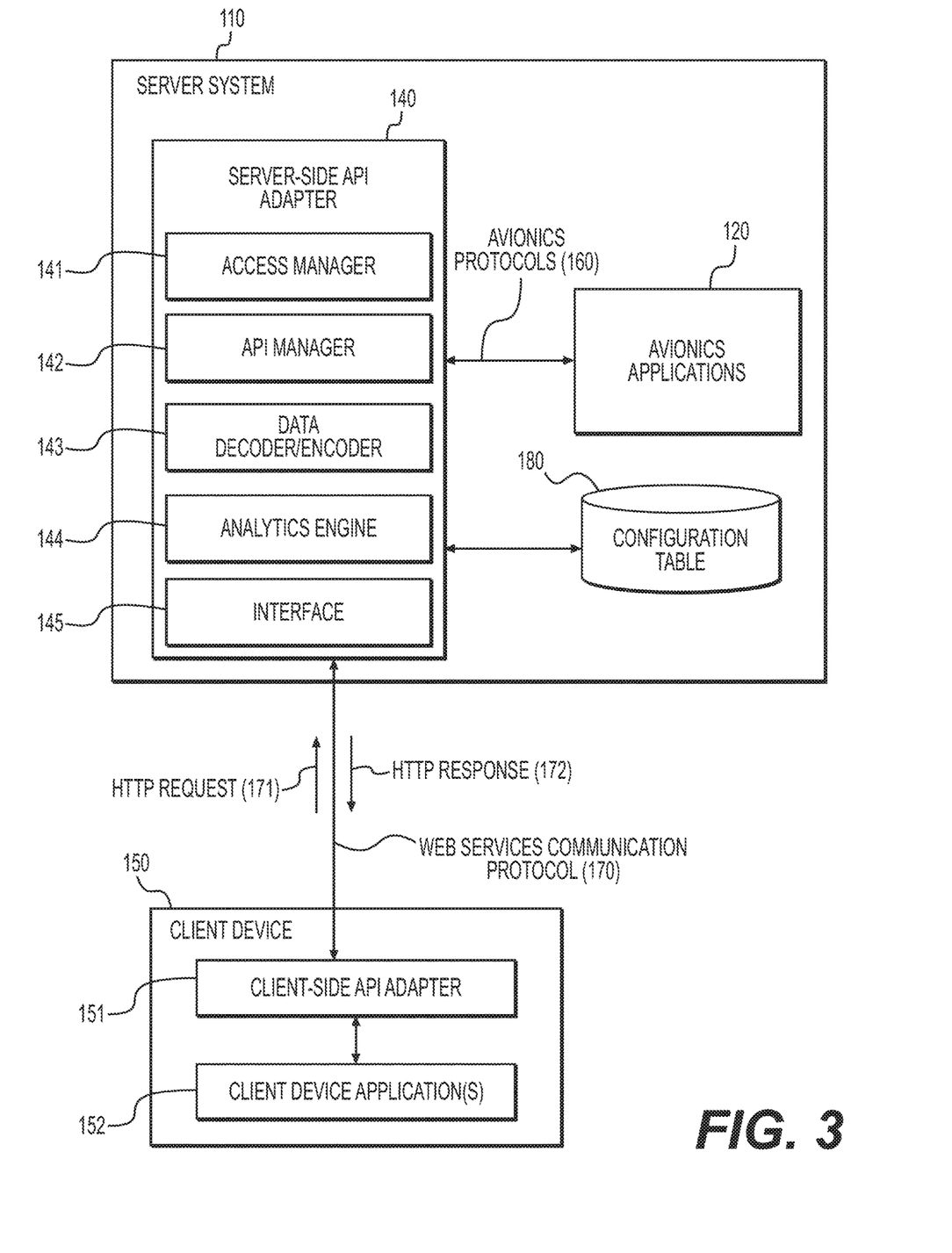
FIG. 3 illustrates an avionics simulation network environment, according to one or more embodiments.

FIG. 3 illustrates various example features of the server system 110 and the server-side API adapter 140. The server-side API adapter 140 may send messages to, and receive messages from, any one or more of the avionics applications 120, wherein messages communicated in such a manner may be in an avionics protocol data format. Furthermore, the server-side API adapter 140 may send message to, and receive messages from, the client device 150 using the web services communication protocol 170, wherein messages communicated in such a manner may be in a web services data format. In the context of API interactions, a message may be, for example, a request or a response generated based on the request.

The server-side API adapter 140 may include access manager 141, API manager 142, data decoder/encoder 143, analytics engine 144, and interface 145. These components may be implemented as functions or processes of the server-side API adapter, and may operate in accordance with a configuration stored in configuration table 180.

Access manager 141 may be configured to ensure that access privileges are provided for each registered user of the avionics applications 120, so that user may receive data from server system 110 only if they are eligible to receive the data. Access manager 141 may perform a process of authenticating the user of user device 150, and may grant access to the user device 150 only if the user device 150 supplies proper account credentials. Accordingly, access manager 141 may control access to ensure that the APIs of the avionics applications 120 are not exposed to unauthorized users.

API manager 142 may be configured to ensure that appropriate APIs of the avionics applications 120 are invoked for a certain request received from the client device 150. For example, if the avionics applications 120 each have a certain API or set of APIs, the API manager may perform a routing function of routing a request from user device 150 to a proper API of the proper avionics application.

By way of the functionalities of access manager 142, API manager 142, and/or other components of the server-side API adapter 140, the server-side API adapter 140 may control whether or not a certain user is able to access various functionalities provided by the avionics applications 120. Accordingly, the server-side API adapter 140 may perform a process of filtering APIs or API payload based on the training features that are subscribed by user.

For example, an MCDU is a pilot interface by which a pilot may plan a route, initialize performance, and perform various flight management functions. In addition to flight management, an MCDU may be used to perform other functions, such as datalink functions, takeoff and landing (TOLD) functions, and secondary power control and visualization functions. These functionalities of an MCDU may all be provided by the avionics applications 120.

In this example, if the user of the user device 150 is subscribed to only flight management and datalink functionalities of an MCDU, the server-side API adapter 140 may permit the user device 150 to access such functionalities, while denying access to all other functionalities. For example, the server-side API adapter 140 may retrieve user account data indicating the services to which the user of client device 150 is subscribed. When a request (e.g., HTTP request 171) is received from the client 150, the server-side API adapter 140 may verify whether the requested service is within the user's subscription. If the request service is not within the user's subscription, then the server-side API adapter 140 may take no action or return a message denying the request. The filtering functionality described above may be performed based on a configuration stored in configuration table 180. Such configuration may include a list of subscribed services for each user.

The data decoder/encoder 143 may be implemented as a protocol translator configured to perform protocol translation between the web services communication protocol 170 and any of the avionics protocol 160. In order to perform protocol translation, the data decoder/encoder 143 may be configured to convert between a web services data format and any avionics protocol data format used by the avionics applications 120. Additionally, the data decoder/encoder 143 may convert between data formats used in payload content, such as converting between a JSON/REST format to an avionics protocol data format that is understood by the display components. The data decoder/encoder 143 may perform the protocol translation or data format conversion based on the type of avionics protocol that is used or to be used in the communication being processed.

The analytics engine 144 may be configured to perform data analytics on any interaction involving the client device 140 or any one or more of the avionics applications 120. For example, the analytics engine may analyze how and what flight scenarios a user is practicing and suggest recommendations on what further scenarios the learner should practice. The analytics engine may perform push notifications to the user device 150 to provide a user of the user device 150 with recommendations. In some embodiments, the analytics engine 144 may track usage of any one or more of the avionics applications 120 by the client device 150, such that the user of the client device 150 may be charged based on the usage.

The interface 145 may be a web service interface, such as a REST interface. Interface 145 may provide an API (e.g., a REST API) for communication between the server-side API adapter 140 and the client device 150.

As shown in FIG. 3, client device 150 may transmit an HTTP request 171 to the server-side API adapter 140. The server-side API adapter 140 may translate the HTTP request 171 into a message understood by an appropriate one of the avionics applications 120, and invoke an API belonging to that avionics application. Upon receiving a response from the avionics application, the server-side API adapter 140 may translate that response into HTTP response 172, to be sent to the client device 150. In FIG. 3, HTTP request 171 and HTTP response 172 are examples of messages encoded in a web services data format.

Client device 150 may include one or more client device applications 152 that consume a service provided by the avionics applications 120. Interaction between the client device applications 152 and the server system 110 may be through a client-side API adapter 151, as described below. Data transfer between the client device 150 and the server system 110 may occur periodically or based on events at the client device 150.

Figure 4:
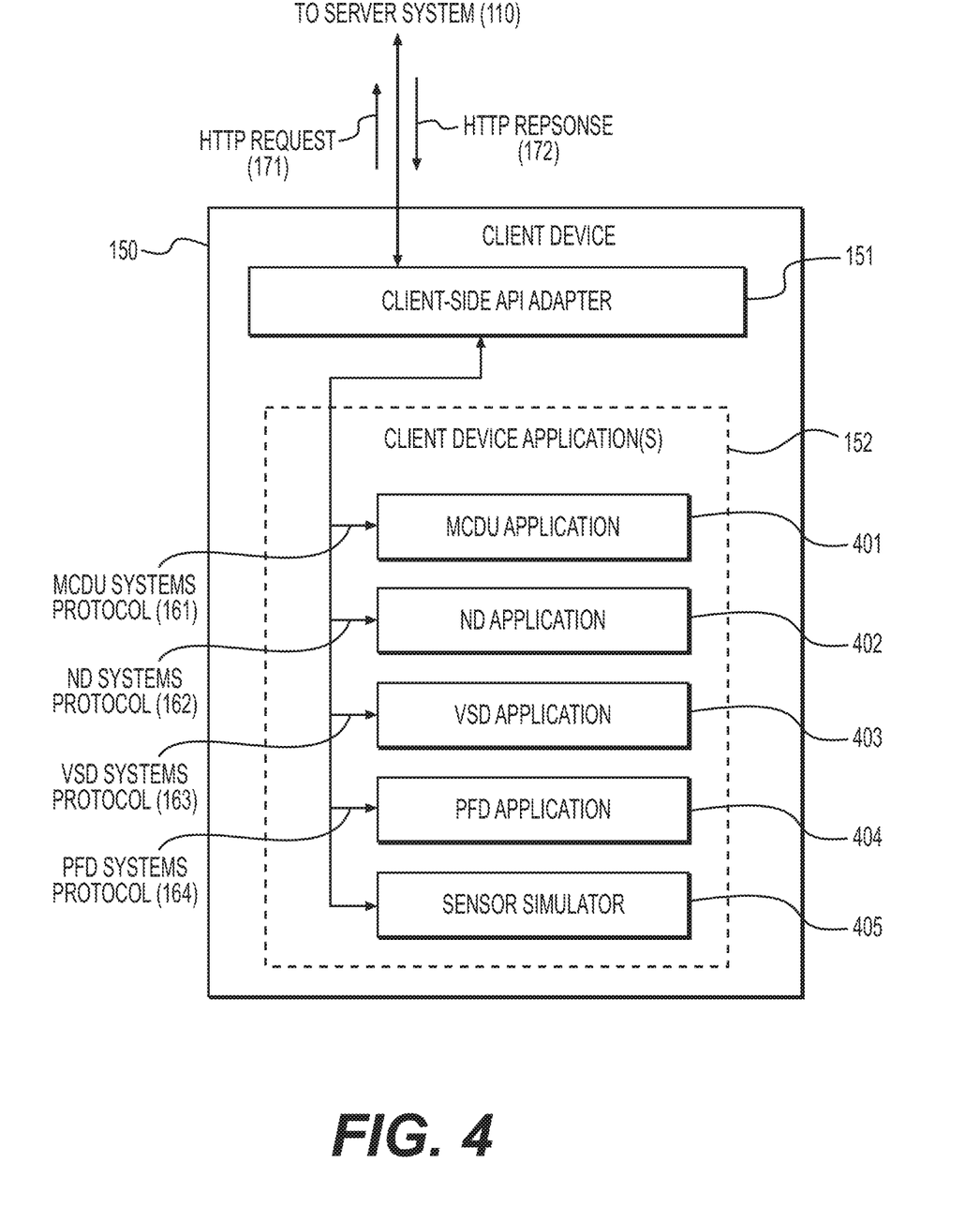
FIG. 4 illustrates an avionics simulation client device, according to one or more embodiments.

FIG. 4 illustrates features of the client device 150. As shown, the client device applications 152 may include avionics display simulation applications, such as a multifunction control and display unit (MCDU) application 401, a navigation display (ND) application 402, and a vertical situation display (VSD) application 403, and a primary flight display (PFD) application 404. These applications 401, 402, 403, and 404 may provide a simulation of the display and input-output functionalities of an MCDU, an ND, a VSD and a PFD. Such simulations may be used for training purposes, although the present disclosure is not limited to such use for avionics simulation applications. The avionics display simulation applications may replicate the specifications and look-and-feel of an on-board display. For example, as described above in relation to FIG. 2, MCDU application 401 and PFD application 404 may generate screens in the manner of screens 201 and 202, respectively.

The client device applications 152 may further include sensor simulator 405 configured to simulate sensor readings that are obtained from sensors on-board an aircraft, such as position sensors, altimeters, and radars. Sensor simulator

405 may generate data used by display simulation applications 401, 402, 403, and 404, and/or by the server system 110.

The display simulation applications 401, 402, 403, and 404 may be configured to send and receive data in an avionics protocol. For example, the MCDU application 401 may be configured to receive and generate data according to an MCDU systems protocol 161 (e.g., ARINC 739), the ND application 402 may be configured to receive and generate data according to an ND systems protocol 162 (e.g., ARINC 702), the VSD application 403 may be configured to receive and generate data in a VSD systems protocol 163 (e.g., ARINC 661), and the PFD application 404 may be configured to receive and generate data in a PFD systems protocol 164 (e.g., ARINC 661 or ARINC 702). Protocols 161, 162, 163, and 164 are examples of avionics protocols 160 described above.

The client-side API adapter 151 may be configured to perform protocol translation between the web services communication protocol 170 and any of the avionics protocol 160. For example, the client-side API adapter 151 may receive a message, such as a request, encoded in a format used in any of the protocols 161, 162, 163, and 164, and convert the message into HTTP request 171. For example, based on the type of action (e.g., entry, selection, modification) indicated by the message, data included in the message, which is in an avionics protocol data format, may be mapped to one or more server-side APIs (e.g., an API provided by interface 145). The one or more server-side APIs may then be invoked through HTTP.

Since the display simulation applications 401, 402, 403, and 404 may be configured to generate and receive data according to different avionics protocols, the contents of the HTTP request 171 generated by the client-side API adapter 151 may depend on the which specific display simulation application generated the initial request.

For example, if MCDU application 401 generated the initial request to interact with server system 110, the client-side API adapter 151 may generate an HTTP request 171 that includes a URI corresponding to requests received from MCDU applications. The server-side API adapter 140, in receiving the HTTP request 171, may invoke an API of one or more of the avionics applications 120 to obtain response data. The server-side API adapter may perform protocol translation on the response data, to generate an HTTP response 172 that includes content used by MCDU application 401 (e.g., content usable by an ARINC 739 API after protocol translation).

Similarly, if the display simulation application interacting with the server system 110 is the ND application 402, then the HTTP request 171 may include a URI corresponding to an API endpoint that handles requests for ND applications, and the HTTP response 172 may include content used by the ND application 402 (e.g., content usable by an ARINC 702 API after protocol translation). If the display simulation application interacting with the server system 110 is an application simulating a multi-function display (MFD) or VSD application 403, then the HTTP request 171 may include a URI corresponding to an API endpoint that handles requests for MFD or VSD applications, and the HTTP response 172 may include content used by the ND application 402 (e.g., content usable by an ARINC 661 API after protocol translation).

Figure 5:
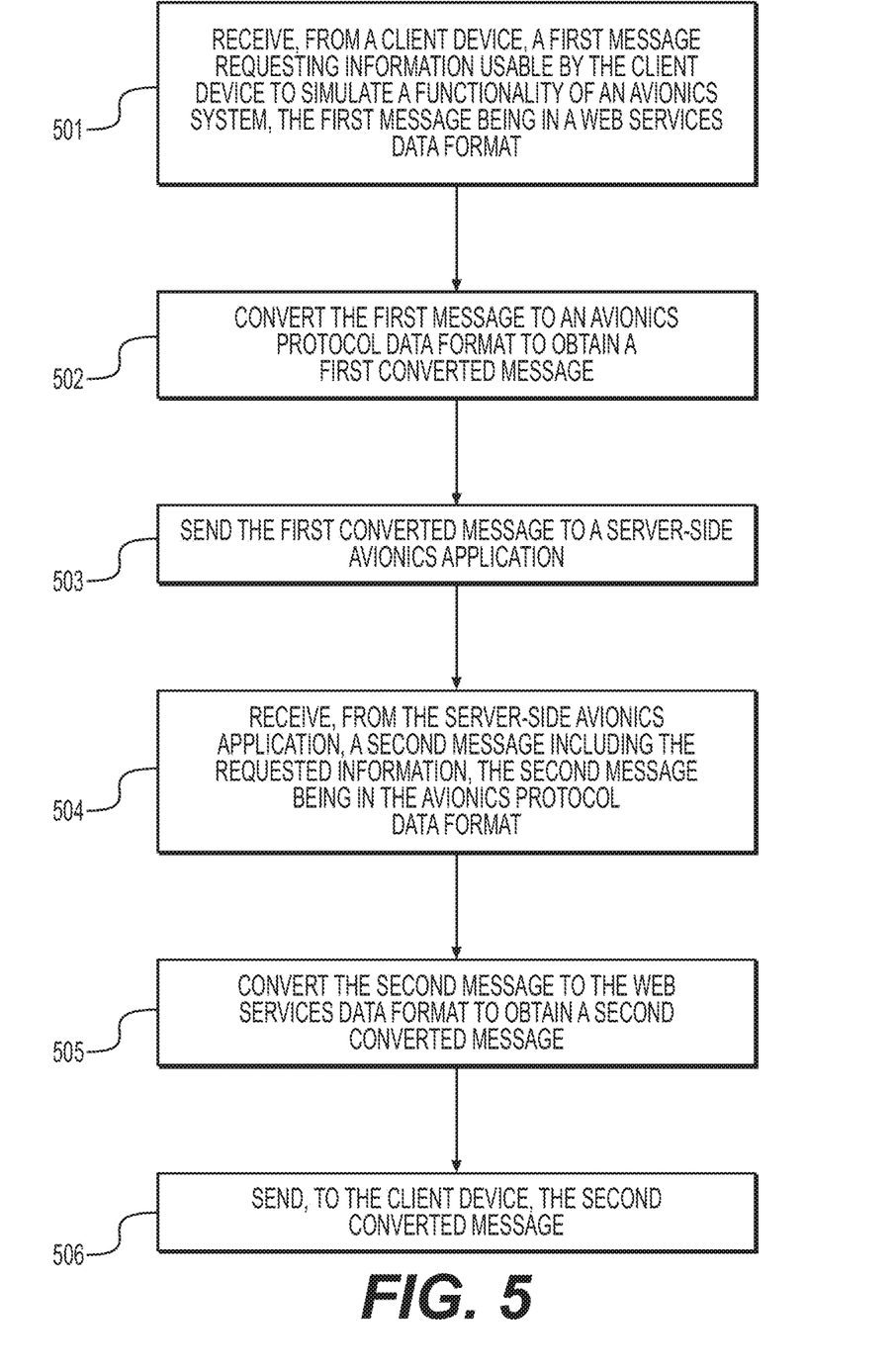
FIG. 5 illustrates a method for providing data for simulating avionics systems, according to one or more embodiments.

FIG. 5 illustrates a method for providing data for simulating avionics systems. The method may be performed by, for example, a computer system executing the server-side API adapter 140, such as server system 110.

Step 501 may include receiving, from a client device, a first message requesting information usable by the client device to simulate a functionality of an avionics system, the first message being in a web services data format. In the method illustrated by FIG. 5, the client device may be client device 150, and the first message may be an HTTP request including payload data in JSON format. Such payload data may be a request generated by a client device application, such as any one of the display simulation applications 401, 402, 403, 404, and 405. The information being requested may be any data used by the client device application, such as data describing information to be displayed on a display screen of a client device. In some examples, the first message may be an API call directed to a REST API provided by the server-side API adapter 140. Accordingly the first message may have a format suitable for the API provided by the server-side API adapter 140. In some examples, the first message may be received over a network, such as network 250.

After receiving the first message, the computer system performing step 501 may perform a user verification step, in accordance with the filtering process described above, to determine whether the user of the client device has permission to access the information requested by the first information. For example, the user verification step may include determining a user account associated with the first message and verifying, based data stored in a user account database, whether the user account has permission (e.g., a valid subscription or registration) for accessing the information. If the user does have permission, then the method may proceed to step 502.

Step 502 may include converting the first message to an avionics protocol data format to obtain a first converted message. The avionic protocol data format may depend on the particular client device application that initially requested the first message.

Step 503 may include sending the first converted message to a server-side avionics application. The server-side avionics application may be any application represented by the avionics application 120 described above. The server-side avionics application may process the first converted message, and generate a response, also in the avionics protocol data format. This response may be referred to as a second message, and may include the information requested by the first message.

Step 504 may include receiving, from the server-side avionics application, the second message including the requested information. The requested information, which may be usable by the client device to simulate a functionality of an avionics system, may be any aviation data that is used by the type of avionics system to be simulated on the client device.

Examples of types of aviation data include: navigation data (e.g., aircraft position data, navigation aid data, airport data, fix and waypoints data), terrain data, flight plan data, communication frequency data, air traffic control and boundary data, magnetic variation data, approach and departure chart data, airport diagrams, weather data, sensor data, data provided by remote services such as data centers and satellite services, Automatic Dependent Surveillance-Broadcast (ADS-B) data, warnings or other data from simulated warning systems (e.g., traffic collision avoidance system (TCAS), terrain awareness and warning system (TAWS)).

The aviation data received from the server-side avionics application may be generated at the server system 110 based input data such as aircraft parameters (e.g., position, altitude, angles) simulated during a simulated flight, aircraft sensor data simulated during the simulated flight, external conditions (e.g., weather, air traffic) simulated during the simulated flight, and user-inputs (e.g., user-inputs to use the functionality of the simulated avionics system). Simulated data may be produced at the client device 150 and/or the server system 110. If produced at the client device 150, the data may be supplied to the server-side avionics application in the first message.

If the server-side avionics application is a flight management system (FMS) application (e.g., FMS application 121) and the avionic system to be simulated is a display system, the aviation data may of any type of data generated by an on-board FMS for display by a cockpit display, such as data describing flight routes, flight route trajectories, flight scenarios assessments and optimizations, and navigation-related information. For example, the first message received from the client device 150 may include aircraft sensor data simulated during a simulated flight (generated by, for example, sensor simulator 405), and the second message received from the FMS application may include an aircraft position for the simulated slight calculated by the FMS application based on the aircraft sensor data.

Step 505 may include converting the second message into the web services data format to obtain a second converted message. HTTP response 172 described above may serve as an example of the second converted message.

Step 506 may include sending, to the client device, the second converted message. In some examples, the first message may be received by client device 150 over the internet.

The second converted message may be received by a client-side API adapter, such as client-side API adapter 151. For example, the client-side API adapter 151 may convert the second converted message into a third converted message, to be used by one of the display simulation applications 401, 402, 403, 404, and 405. The third converted message may be data that is in an avionics protocol data format. Using the third converted message, the display simulation application may display the information provided by the server system 110, to thereby simulate a functionality of the avionic system.

Furthermore the computer system performing the method of FIG. 5 may additionally perform a data recording step that includes recording a characteristic of the first message, the first converted message, the second message, the second converted message, and/or the information received from the server-side avionics application. Such characteristic may, for example, indicate a training content (e.g., training module) requested by or provided to the user device, and usage thereof by the user of the client device. The data recording step may be performed at any point after step 501, for example.

In some embodiments, the information sent to the user device may be additionally provided to other user devices. Accordingly, the computer system performing the method of FIG. 5 may cast multiple streams to multiple user devices, based on training services subscription/registration. Such implementations may be used so that a training instructor can visualize the data along with the user (e.g., a pilot). The server-side API adapter (e.g., server-side API adapter 140) may track the delivery of training content and analyze the effectiveness of the training based on a data stream provided through the server-side API adapter.

Figure 6:
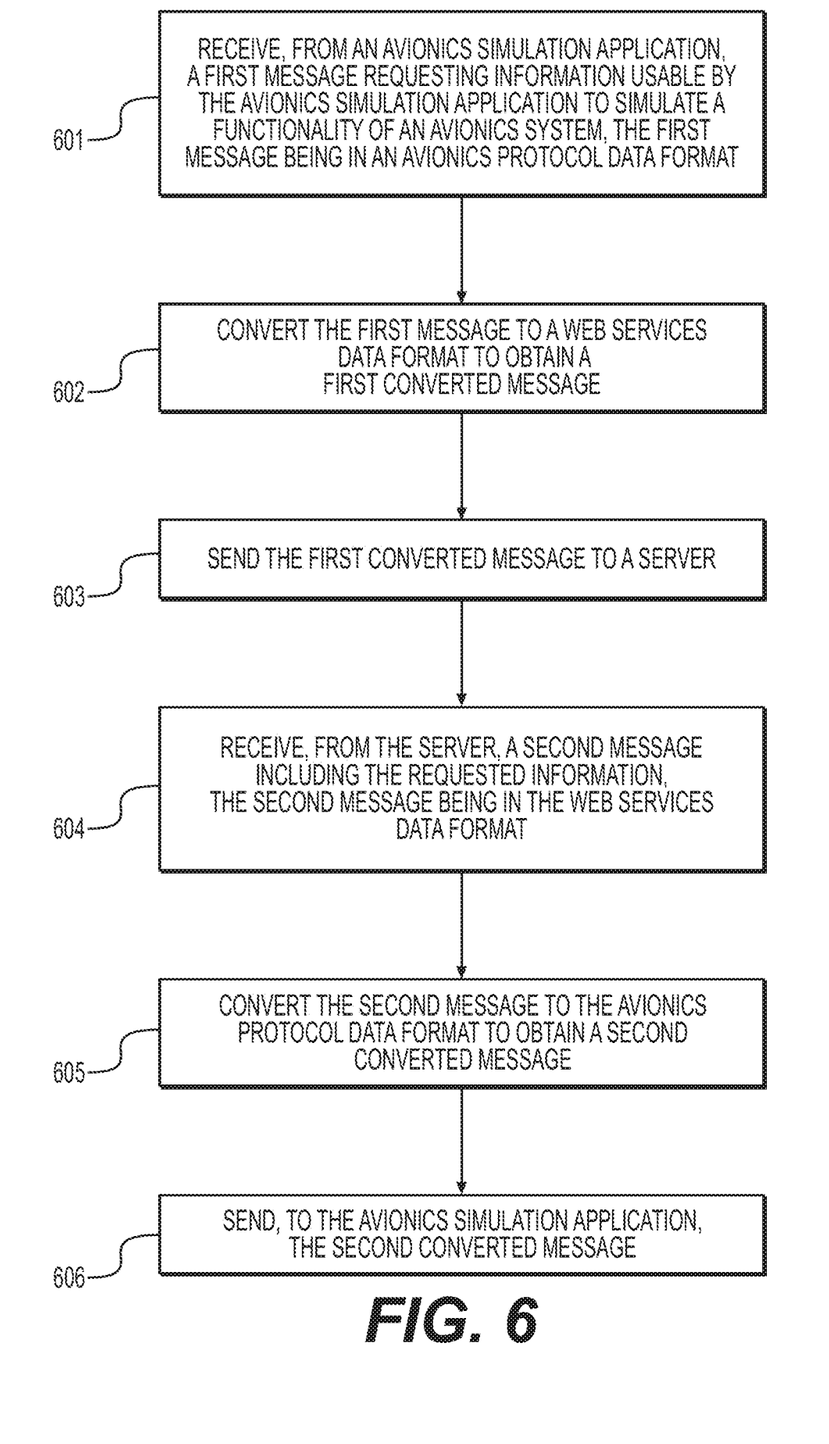
FIG. 6 illustrates a method for requesting data for simulating avionics systems, according to one or more embodiments.

FIG. 6 illustrates a method for requesting data for simulating avionics systems. The method may be performed by, for example, a computer system executing the client-side API adapter 151, such as client device 150.

Step 601 may include receiving, from an avionics simulation application, a first message requesting information usable by the avionics simulation application to simulate a functionality of an avionics system, the first message being in an avionics protocol data format. The avionics simulation application may be, for example, any one of the client device applications 152 described above.

Step 602 may include converting the first message to a web services data format to obtain a first converted message. Step 603 may include sending the first converted message to a server. In step 603, the server may be server system 110, for example. Step 604 may include receiving, from the server, a second message including the requested information, the second message being in the web services data format. Step 605 may include converting the second message to the avionics protocol data format to obtain a second converted message. Step 606 may include sending, to the avionics simulation application, the second converted message. The first converted message and the second message may be, for example HTTP request 171 and HTTP response 172, respectively. The computer system performing the method of FIG. 6 may further use the received information to conduct the simulation, if the avionics simulation application is part of the computer system.

By implementing API adapters as described in this disclosure, it becomes possible to use avionics applications (that are certified for usage with on-board avionics, for example) for pilot training and familiarization services delivered to client devices that may take the form of personal computers or mobile computing devices. Therefore, a cost-effective and efficient approach in delivering full cockpit avionics experience in training setups using client devices may be realized.

Furthermore, because the architecture for interaction between the avionics applications of the server system and the client device is similar or equivalent to the architecture providing for interaction between the avionics applications and on-board avionics systems, it is possible to update the avionics applications in a manner compatible with both the client devices and the on-board avionic systems.

Furthermore, the server-side API adapter may be implemented to provide various control mechanisms, such as the filtering of API payloads based on user subscription accounts and data analytics. Data analytics implemented using the server-side API adapter makes it possible to obtain data on how a user is progressing in learning, make recommendations to the pilot for training purposes, and track usage of training services so that the user may be charged based on his or her usage of training services.

In general, any process discussed in this disclosure that is understood to be computer-implementable, such as the processes illustrated in FIGS. 2-3, may be performed by one or more processors of a computer system, such as server system 110 and/or client device 150, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as server system 110 and client device 150, may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 7:
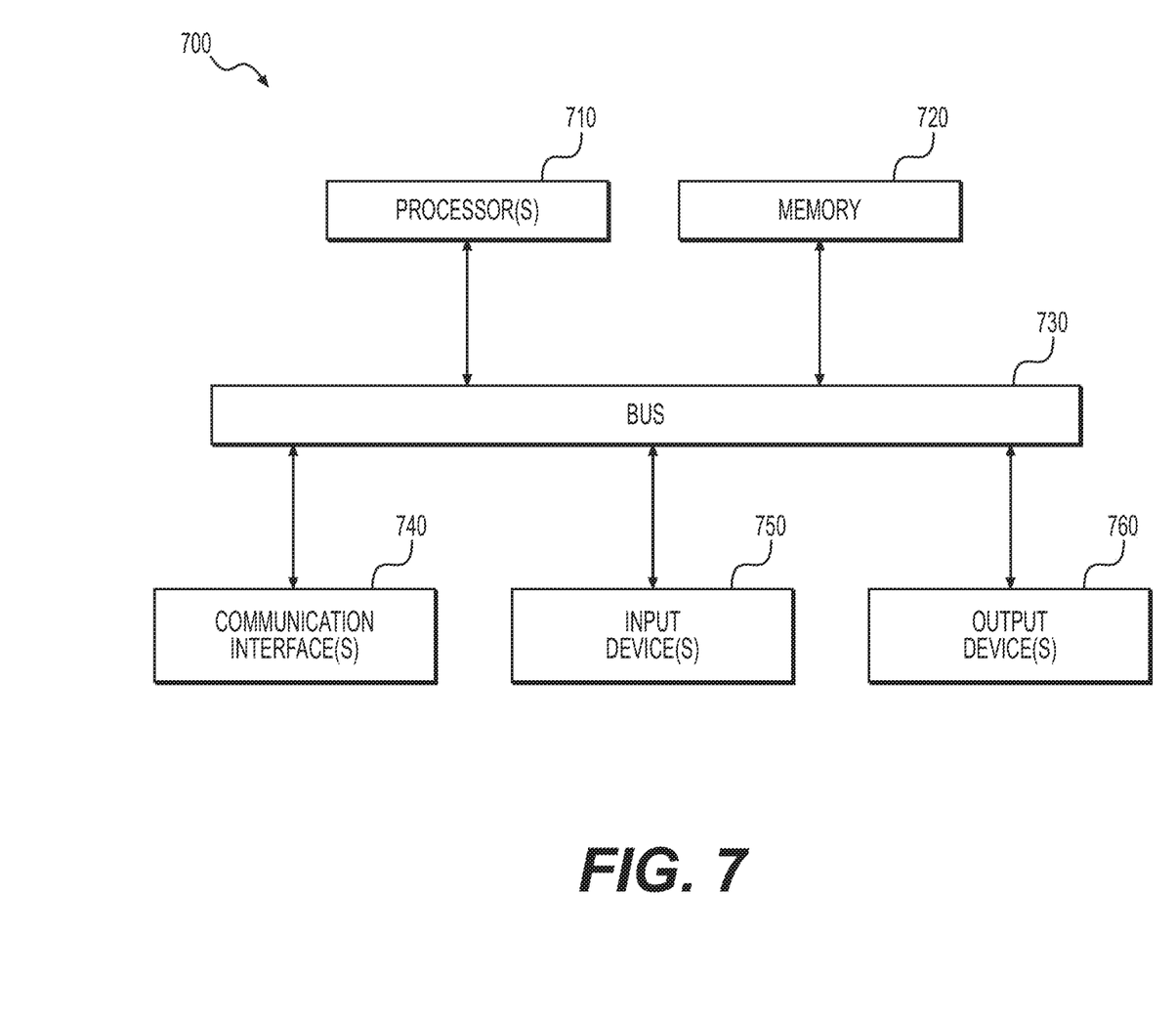
FIG. 7 illustrates a computing device according to one or more embodiments.

FIG. 7 illustrates an example of a computing device 700 of a computer system that may execute techniques presented herein. The computing device 700 may include processor(s) 710 (e.g., CPU, GPU, or other such processing unit(s)), a memory 720, and communication interface(s) 740 (e.g., a network interface) to communicate with other devices. Memory 720 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 720. The computing device 700 may, in some embodiments, further include input device(s) 750 (e.g., a keyboard, mouse, or touchscreen) and output device(s) 760 (e.g., a display, printer). The aforementioned elements of the computing device 700 may be connected to one another through a bus 730, which represents one or more busses. In some embodiments, the processor(s) 710 of the computing device 700 include both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for providing data for simulating avionics systems, the method comprising:
   receiving, from a client device, a first message comprising requested information usable by the client device to simulate a functionality of an avionics system, the first message being in a web services data format;
   converting the first message to an avionics protocol data format to obtain a first converted message;
   providing the first converted message to a server application;
   receiving, from the server application, a second message including the requested information, the second message being in the avionics protocol data format;
   converting the second message to the web services data format to obtain a second converted message; and
   providing, to the client device, the second converted message.

2. The method of claim 1, wherein
   the web services data format is an HyperText Transfer Protocol (HTTP) message format, and
   the first message and the second converted message each includes content in JavaScript Object Notation (JSON) format.

3. The method of claim 1, wherein the first message is a REST API request.

4. The method of claim 1, wherein the requested information includes aviation data displayable by a cockpit display, the requested information being usable by the client device to simulate a display functionality of the cockpit display.

5. The method of claim 4, wherein the server application is a flight management application.

6. The method of claim 5, wherein
   the first message includes simulated aircraft sensor data, and
   the requested information includes an aircraft position calculated by the server application using the simulated aircraft sensor data.

7. The method of claim 1, further comprising, after the receiving the first message determining that a user of the client device has permission to access a service of the server application that generates the requested information.

8. The method of claim 1, further comprising recording a usage of the requested information by the client device.

9. A computer system for providing data for simulating avionics systems, the computer system comprising
a memory storing instructions; and
one or more processors configured to execute the instructions to perform operations including:
receiving, from a client device, a first message requesting information usable by the client device to simulate a functionality of an avionics system, the first message being in a web services data format;
converting the first message to an avionics protocol data format to obtain a first converted message;
providing the first converted message to a server application;
receiving, from the server application, a second message including the requested information, the second message being in the avionics protocol data format;
converting the second message to the web services data format to obtain a second converted message; and
providing, to the client device, the second converted message.

10. The computer system of claim 9, wherein
the web services data format is an HyperText Transfer Protocol (HTTP) message format, and
the first message and the second converted message each includes content in JavaScript Object Notation (JSON) format.

11. The computer system of claim 9, wherein the first message is a REST API request.

12. The computer system of claim 9, wherein the requested information includes aviation data displayable by a cockpit display, the requested information being usable by the client device to simulate a display functionality of the cockpit display.

13. The computer system of claim 12, wherein the server application is a flight management application.

14. The computer system of claim 13, wherein
the first message includes simulated aircraft sensor data, and
the requested information includes an aircraft position calculated by the avionics application using the simulated aircraft sensor data.

15. The computer system of claim 9, wherein the operations further comprise:
after the receiving the first message determining that a user of the client device has permission to access a service of the aviation application that generates the requested information.

16. The computer system of claim 9, wherein the operations further comprise
recording a usage of the requested information by the client device.

17. A non-transitory computer-readable medium storing instructions that, when executed by one or more processors of a computer system, cause the one or more processors to perform a method for requesting and receiving data for simulating avionics systems, the method comprising:
receiving, from an avionics simulation application, a first message requesting information usable by the avionics simulation application to simulate a functionality of an avionics system, the first message being in an avionics protocol data format;
converting the first message to a web services data format to obtain a first converted message;
providing the first converted message to a server;
receiving, from the server, a second message including the requested information, the second message being in the web services data format;
converting the second message to the avionics protocol data format to obtain a second converted message; and
providing, to the avionics simulation application, the second converted message.

18. The non-transitory computer-readable medium of claim 17, wherein
the web services data format is an HyperText Transfer Protocol (HTTP) message format, and
the first message and the second converted message each includes content in JavaScript Object Notation (JSON) format.

19. The non-transitory computer-readable medium of claim 17, wherein the first converted message is a REST API request.

20. The non-transitory computer-readable medium of claim 17, wherein the requested information includes aviation data displayable by a cockpit display, the requested information being usable by the avionics simulation application to simulate a display functionality of the cockpit display.

* * * * *